6384X
C. Otis.
Alcohol Still.
Patented Feb. 16, 1831.
NO PRINTED COPY OF SPECIFICATION IN OFFICE.
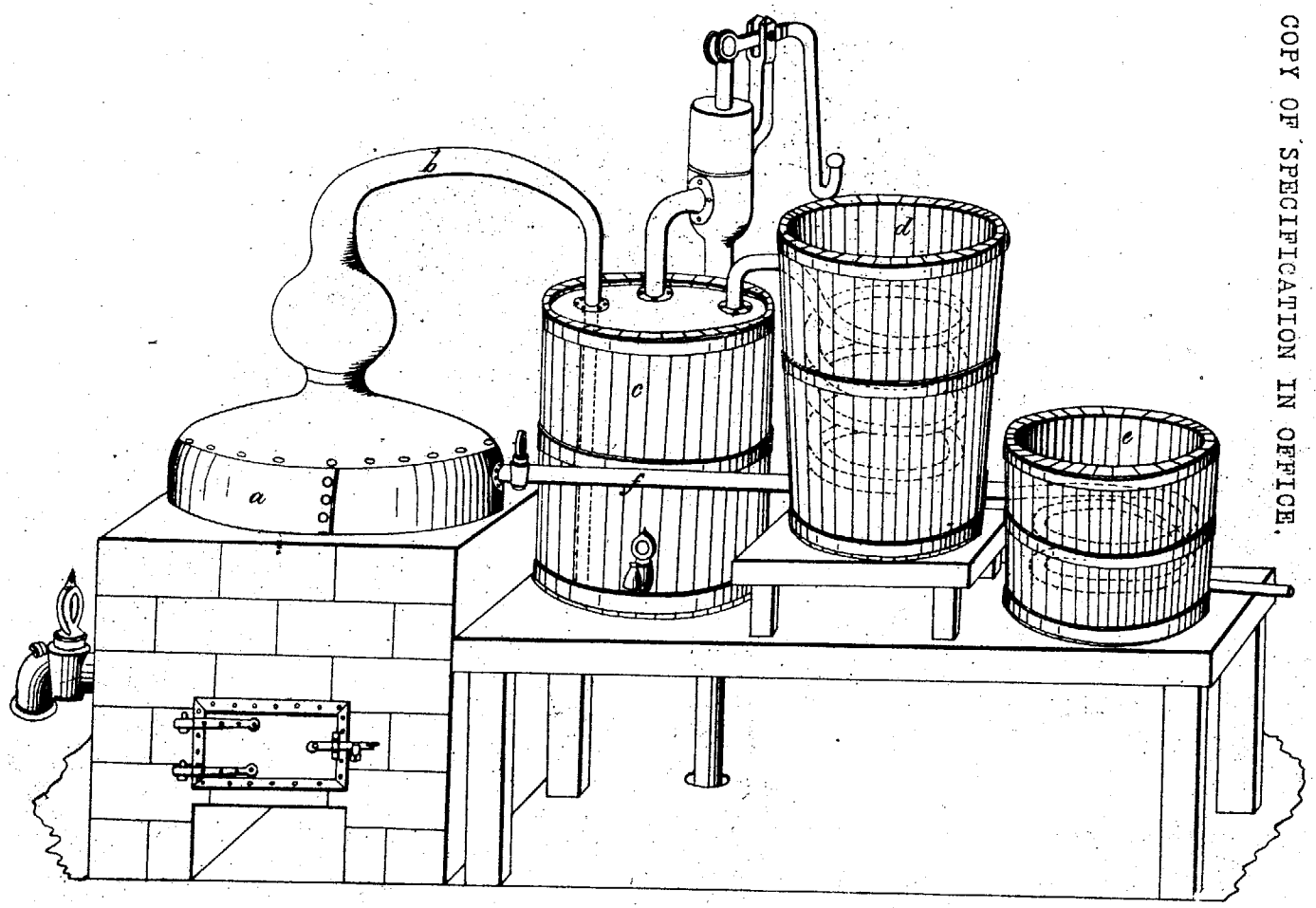

Charles Otis

Letters patent.—

The Schedule referred to in these Letters Patent, and making part of the same, containing a description in the words of the said Charles Otis himself, of his Improvement in the apparatus for Distilling.—

---

To all whom it may concern; be it known that I, Charles Otis, have made an improvement in the apparatus used for Distilling, and that the following is a full and exact description of the same.

The still may be constructed in the ordinary manner. a tube is to lead from the beak of the still into a tub or vessel which contains low wines. The top of the tub is made to fit steam tight, and the before mentioned tube passes through it, being also so closely fitted as to prevent the escape of any vapour around it, and extending nearly to the bottom of the vessel. The vapour from the beer which is contained in the still, will thus pass into the vessel containing the low wines and cause the liquid to boil.

A tube leads from the upper part of the vessel of low wines, into a second tub containing a still worm, and called the heater. This heater is to be filled with the beer with which the still is to be charged. This beer becomes heated in consequence of the partial condensation of the vapour in its passage through the worm. This heater is to be elevated, so that a tube inserted near the bottom of it may convey the heated beer into the still, when it is ready for a charge.

From the worm in the heater the spirit is conducted through a cooler in the usual way.

By this arrangement of the distilling apparatus, the low are converted into high wines by the operation of the vapour

6384X of the beer contained in the still.

I usually insert the still in a second vefsel so as to distil by a water-bath; in this case I economise heat by conducting the steam from this second or outer vefsel by means of tubes, so as to heat a second still, or to aid in performing other operations in the still house, to which it may be applicable. Sometimes I convey the steam through a tube, provided with a cock, from the outer vefsel into the still. This, however, I do not claim as making any part of my invention.

What I claim as new, and for which I ask a patent, is the conducting the vapour from the first distillation of the beer into a vefsel containing low wines, in the manner and for the purposes hereinbefore described.

Witnefses Charles Otis

Thos P. Jones

Joel Eastman

Exd. Patented Feb. 16. 1831 (470 words)

1146.